United States Patent
Liu et al.

(10) Patent No.: US 11,343,175 B2
(45) Date of Patent: May 24, 2022

(54) PACKET FORWARDING

(71) Applicant: New H3C Technologies Co., Ltd., Hangzhou (CN)

(72) Inventors: Wenyu Liu, Beijing (CN); Jiajia Liu, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 16/643,175

(22) PCT Filed: Aug. 30, 2018

(86) PCT No.: PCT/CN2018/103321
§ 371 (c)(1),
(2) Date: Feb. 28, 2020

(87) PCT Pub. No.: WO2019/042372
PCT Pub. Date: Mar. 7, 2019

(65) Prior Publication Data
US 2020/0389388 A1 Dec. 10, 2020

(30) Foreign Application Priority Data
Aug. 30, 2017 (CN) .......................... 201710763296.6

(51) Int. Cl.
*H04L 45/24* (2022.01)
*H04L 45/7453* (2022.01)

(52) U.S. Cl.
CPC ........ *H04L 45/245* (2013.01); *H04L 45/7453* (2013.01)

(58) Field of Classification Search
CPC .......................... H04L 45/245; H04L 45/7453
See application file for complete search history.

(56) References Cited

U.S. PATENT DOCUMENTS 7,912,091 B1 * 3/2011 Krishnan ................ H04L 45/02
709/224
10,243,838 B1 * 3/2019 Maharia ................ H04L 45/245
(Continued)

FOREIGN PATENT DOCUMENTS

| CN | 101404619 | 4/2009 |
| CN | 102148768 | 8/2011 |

(Continued)

OTHER PUBLICATIONS

Extended European Search Report issued in Corresponding European Application No. 18852037.3, dated May 27, 2020.
(Continued)

*Primary Examiner* — Donald L Mills
(74) *Attorney, Agent, or Firm* — Norton Rose Fulbright US LLP

(57) ABSTRACT

The present disclosure relates to packet forwarding including: determining, according to a forwarding table, an outgoing interface aggregation group corresponding to an incoming interface having received a packet, wherein the forwarding table indicating a relationship between the incoming interface and the outgoing interface aggregation group; selecting, when the outgoing interface aggregation group includes at least one outgoing interface which belongs to the same NUMA node as the incoming interface, a first outgoing interface for sending the packet from the at least one outgoing interface, wherein the NUMA node being non-uniform memory access architecture node; and sending the packet through the first outgoing interface.

16 Claims, 5 Drawing Sheets

(56) References Cited

U.S. PATENT DOCUMENTS

| | | |
|---|---|---|
| 2011/0247000 A1 | 10/2011 | Eidus et al. |
| 2014/0223442 A1 * | 8/2014 | Eidus et al. |
| 2016/0234067 A1 * | 8/2016 | Dolganow .......... H04L 47/2483 |
| 2017/0085467 A1 * | 3/2017 | Ford .................... H04L 45/245 |
| 2019/0020601 A1 | 1/2019 | Liu |

FOREIGN PATENT DOCUMENTS

| | | |
|---|---|---|
| CN | 104901898 | 9/2015 |
| CN | 106936739 | 7/2017 |
| CN | 108259328 | 7/2018 |
| WO | WO 2012/068579 | 5/2012 |
| WO | WO 2017/114447 | 7/2017 |

OTHER PUBLICATIONS

International Search Report and Written Opinion issued in corresponding international application No. PCT/CN2018/103321, dated Nov. 14, 2018 (English Translation of International Search Report Provided).

Notification to Grant Patent Right for Invention issued in Corresponding Chinese Application No. 201710763296.6, dated Apr. 27, 2020 (English translation provided).

Office Action issued in Corresponding Japanese Application No. 2020-511448, dated Mar. 9, 2021 (English Abstract provided).

Office Action issued in Corresponding European Application No. 18852037.3 dated Jan. 4, 2022.

* cited by examiner

PACKET FORWARDING

CROSS-REFERENCE TO RELATED APPLICATIONS

The present application is a national phase under 35 U.S.C. § 371 of International Application No. PCT/CN2018/103321, filed Aug. 30, 2018, which claims the benefit of priority to Chinese Patent Application No.201710763296.6, filed on Aug. 30, 2017, the entire contents of each of which are incorporated herein by reference in their entirety.

BACKGROUND

Non-Uniform Memory Access Architecture (NUMA) is a computer memory design for multiprocessor, of which the memory access time depends on the memory location of the processor. Through NUMA architecture, dozens or even hundreds of Central Processing Units (CPUs) may be combined in one device. NUMA architecture may have multiple NUMA nodes, each with multiple CPUs, a local memory, an I/O interface, and a network card, and so on.

Link aggregation is to aggregate multiple physical Ethernet interfaces to form a logical aggregation group. An upper layer entity using a link aggregation service considers multiple physical links in the same aggregation group as one logical link. Multiple Ethernet physical ports are bound to form an Ethernet logical link, so as to realize the objective of increasing the link bandwidth. Link aggregation is generally used to connect one or more devices with large bandwidth demands, for example, a server or a server cluster connected to a backbone network.

BRIEF DESCRIPTION OF THE DRAWINGS

The drawings, which are incorporated in and constitute part of the specification, together with the description, illustrate exemplary embodiments, features and aspects of the present disclosure and serve to explain the principles of the present disclosure.

DETAILED DESCRIPTION

Figure 1:
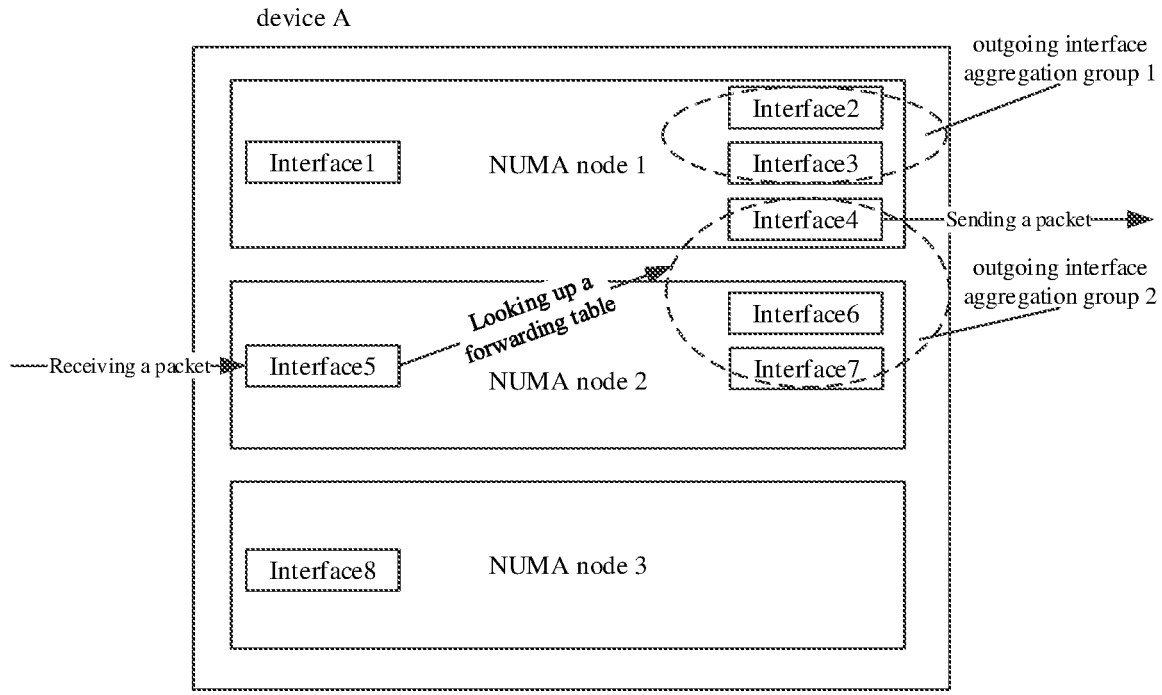
FIG. 1 is a structural diagram of a device of the related art after link aggregation.

Various exemplary embodiments, features and aspects of the present disclosure will be described in detail with reference to the drawings. The same reference numerals in the drawings represent parts having the same or similar functions. Although various aspects of the embodiments are shown in the drawings, it is unnecessary to proportionally draw the drawings unless otherwise specified.

Herein the term "exemplary" means "used as an example or embodiment, or explanatory". Any "exemplary" embodiment given here is not necessarily construed as being superior to or better than other embodiments.

Furthermore, numerous details are given in the following embodiments for the purpose of better explaining the present disclosure. It should be understood by a person skilled in the art that the present disclosure may still be realized even without some of those details. In some of the embodiments, methods, means, elements and circuits that are well known to a person skilled in the art are not described in detail so that the principle of the present disclosure become apparent.

After link aggregation is performed between devices using a NUMA framework, interfaces of respective physical links may be distributed on different NUMA nodes. When the interfaces of respective physical links are distributed on different NUMA nodes, if an outgoing interface that does not belong to the same NUMA node as the incoming interface is selected, packet forwarding across NUMA nodes occurs, causing an increase in the computational overhead and a decrease in the forwarding efficiency of the device, thereby resulting in reduced throughput of the device.

FIG. 1 is a structural diagram of a device of related technology after link aggregation. As shown in FIG. 1, the device A has a NUMA node 1, a NUMA node 2, and a NUMA node 3. The device A further has interfaces 1 to 8. All of the interfaces 1 to 8 are physical Ethernet interfaces. The interface 1, the interface 5, and the interface 8 serve as incoming interfaces for receiving packets. The interface 2, the interface 3, the interface 4, the interface 6, and the interface 7 serve as outgoing interfaces for sending packets. The interface 2 and the interface 3 are aggregated to form an outgoing interface aggregation group 1. The interface 4, the interface 6, and the interface 7 are aggregated to form an outgoing interface aggregation group 2. The interface 1, the interface 2, the interface 3, and the interface 4 belong to the NUMA node 1, the interface 5, the interface 6 and the interface 7 belong to the NUMA node 2, and the interface 8 belongs to the NUMA node 3.

In the related art, as shown in FIG. 1, when the interface 5 receives a packet, the device A looks up a forwarding table to determine that the outgoing interface aggregation group corresponding to the interface 5 is the outgoing interface aggregation group 2. The device A may select an outgoing interface for sending the packet from the multiple outgoing interfaces (the interface 4, the interface 6, and the interface 7) included in the outgoing interface aggregation group 2. For example, the device A selects the interface 4 for sending the packet, and then the device A sends the packet through the interface 4. During the process of forwarding the packet, the interface 5 receives the packet and the interface 4 sends the packet. The interface 5 and the interface 4 belong to different NUMA nodes, resulting in forwarding packets across NUMA nodes. The NUMA node 2 needs to access the memory of the NUMA node 1, causing an increase in the computational overhead and a decrease in the forwarding efficiency of the device A, thereby resulting in a reduced throughput of the device A.

Figure 2:
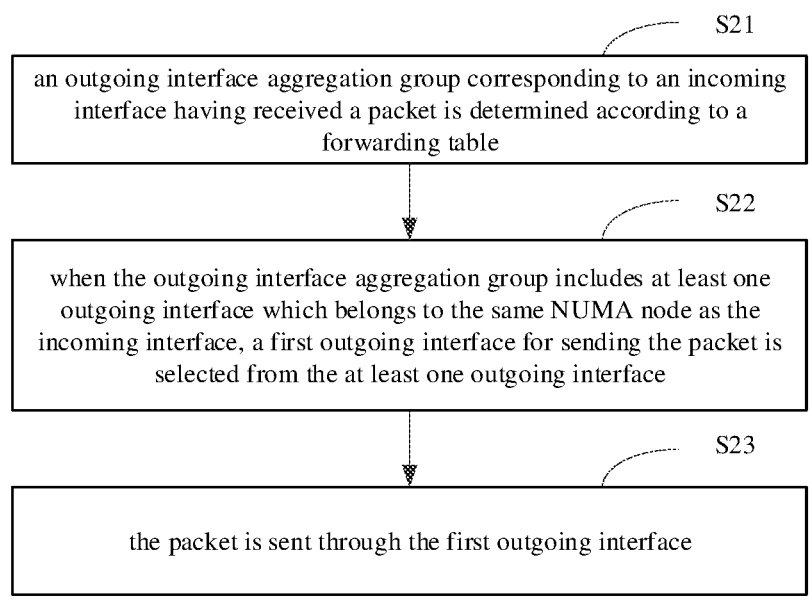
FIG. 2 is a flow chart of a method for packet forwarding according to an embodiment of the present disclosure.

FIG. 2 is a flow chart of a method for packet forwarding based on an embodiment of the present disclosure. The method may be used for a device of NUMA architecture, such as a NUMA server, and so on, which is not limited in the present disclosure. As shown in FIG. 2, the method includes steps S21 to S23.

In the step S21, an outgoing interface aggregation group corresponding to an incoming interface having received a packet is determined based on a forwarding table, wherein, the forwarding table indicates a relationship between the incoming interfaces and the outgoing interface aggregation groups.

The incoming interface may refer to a physical Ethernet interface for receiving the packet. The outgoing interface may refer to a physical Ethernet interface for sending the packet. The forwarding table may refer to a data structure which enables the device to forward the received packet through an appropriate interface of the device. The forwarding table may include a mapping between incoming interfaces and outgoing interfaces, such that when a packet is received from an incoming interface, the packet is forwarded through a corresponding outgoing interface under the guidance of the forwarding table. Specifically, a method of the prior art may be used to define the forwarding table, and it is not limited in the present disclosure. The outgoing interface aggregation group may be a logical aggregation group formed by aggregating multiple outgoing interfaces. Multiple outgoing interfaces included in the outgoing interface aggregation group have the same effect of packet forwarding.

In a possible implementation, when an incoming interface receives a packet, an outgoing interface or an outgoing interface aggregation group corresponding to the incoming interface may be determined, based on identification information of the incoming interface and the forwarding table. In other words, in the case where the incoming interface corresponds to one outgoing interface, the packet may be sent through the outgoing interface corresponding to the incoming interface. In the case where the incoming interface corresponds to an outgoing interface aggregation group, an outgoing interface may be selected from the outgoing interface aggregation group to send the packet. The identification information of the incoming interface may be information that uniquely identifies the incoming interface, such as an interface number of the incoming interface, which is not limited in the present disclosure.

In the step S22, when the outgoing interface aggregation group includes at least one outgoing interface which belongs to the same NUMA node as the incoming interface, a first outgoing interface for sending the packet is selected from the at least one outgoing interface.

In a possible implementation, after an outgoing interface aggregation group, corresponding to the incoming interface having received the packet, is determined based on the forwarding table, if there is only one outgoing interface which belongs to the same NUMA node as the incoming interface, the only one outgoing interface in the multiple outgoing interfaces included in the outgoing interface aggregation group may serve as a first outgoing interface for sending the packet.

In a possible implementation, after an outgoing interface aggregation group corresponding to the incoming interface having received the packet is determined based on the forwarding table, if there exist multiple outgoing interfaces in the outgoing interface aggregation group which belong to the same NUMA node as the incoming interface, one outgoing interface may be selected from the existed multiple outgoing interfaces as a first outgoing interface for sending the packet. It should be noted that the present disclosure does not limit the specific manner of selecting the first outgoing interface from the existed multiple outgoing interfaces. For example, the outgoing interface may be selected randomly. For another example, the corresponding outgoing interface may be determined by load balancing based on a packet feature.

In a possible implementation, the method further includes establishing a mapping between interfaces and NUMA nodes.

For example, an interface-NUMA node relationship table may be established. The interface-NUMA node relationship table may include a mapping between each interface of the device and NUMA nodes. An interface number is used as an indexing keyword, and a NUMA node to which an interface belongs may be determined by indexing the interface-NUMA node relationship table with the interface number. Alternatively, a NUMA node number is used as an indexing keyword, and interfaces included in a NUMA node may be determined by indexing a NUMA node-interface relationship table with the NUMA node number. In a possible implementation, in order to facilitate the determination of a NUMA node corresponding to an interface and the determination of outgoing interfaces included in an NUMA node, the aforementioned two relationship tables may be stored simultaneously. Of course, the two relationship tables may be recorded by two entries respectively, or by a single entry. The two relationship tables may be stored in a storage medium such as a disk of the device, which is not limited in the present disclosure.

In the step S23, the packet is sent through the first outgoing interface.

Figure 3:
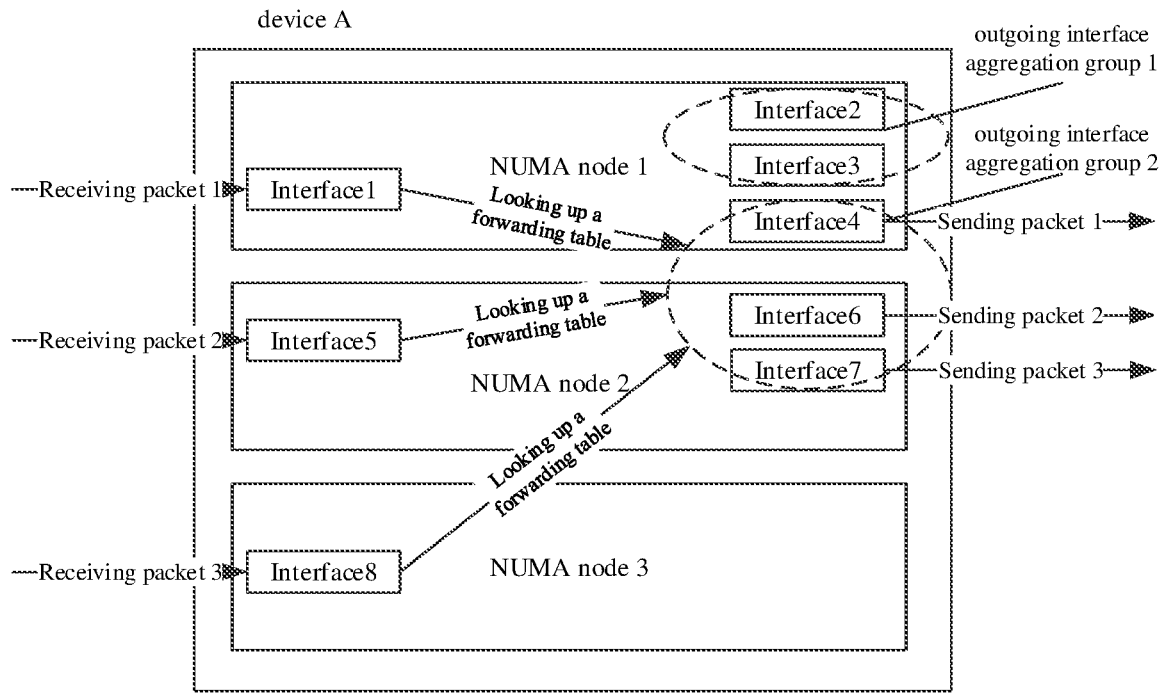
FIG. 3 is a structural diagram of a device in an embodiment of the present disclosure after link aggregation.

FIG. 3 is a structural diagram of a device in an embodiment of the present disclosure after link aggregation. As shown in FIG. 3, the device A has a Non-Uniform Memory Access Architecture. The device A has a NUMA node 1, a NUMA node 2, and a NUMA node 3. Each NUMA node has multiple CPUs, a local memory, an I/O interface, and a Network Interface Card. The device A further has interfaces 1 to 8. The interfaces 1 to 8 are physical Ethernet interfaces. The interface 1, the interface 5, and the interface 8 are incoming interfaces. The interface 2, the interface 3, the interface 4, the interface 6, and the interface 7 are outgoing interfaces. The interface 2 and the interface 3 are aggregated to form an outgoing interface aggregation group 1. The interface 4, the interface 6, and the interface 7 are aggregated to form an outgoing interface aggregation group 2. The interface 1, the interface 2, the interface 3, and the interface 4 belong to the NUMA node 1. The interface 5, the interface 6, and the interface 7 belong to the NUMA node 2. The interface 8 belongs to the NUMA node 3.

As an example of this embodiment, as shown in FIG. 3, in the case where the interface 1 receives a packet 1, the device A looks up a forwarding table, to determine that an outgoing interface aggregation group corresponding to the interface 1 is the outgoing interface aggregation group 2. The device A may select an outgoing interface for sending the packet 1 from multiple outgoing interfaces (the interface 4, the interface 6, and the interface 7) included in the outgoing interface aggregation group 2. Since the interface 4 in the multiple outgoing interfaces included in the outgoing interface aggregation group 2 and the interface 1 belong to the same NUMA node, the interface 4 may serve as the outgoing interface for sending the packet 1, that is, the packet 1 is sent through the interface 4. During the forwarding of the packet 1, the interface 1 receives the packet 1, and the interface 4 sends the packet 1. The interface 1 and the interface 4 belong to the same NUMA node, so that the packet is not forwarded across NUMA nodes. Therefore, only a local memory of a NUMA node needs to be accessed during the packet forwarding process, reducing the computational overhead of the device, and improving the forwarding efficiency and throughput of the device.

As an example of this embodiment, as shown in FIG. 3, in the case where an interface 5 receives a packet 2, the device A looks up a forwarding table to determine that an outgoing interface aggregation group corresponding to the interface 5 is the outgoing interface aggregation group 2. The device A may select an outgoing interface for sending the packet 2 from multiple outgoing interfaces (the interface 4, the interface 6, and the interface 7) included in the outgoing interface aggregation group 2. Since the interface 6 and the interface 7 in the multiple outgoing interfaces included in the outgoing interface aggregation group 2 and the interface 5 belong to the same NUMA node, the interface 6 or the interface 7 may serve as the outgoing interface for sending the packet 2. For example, the interface 6 may be selected to send the packet 2. During the forwarding of the packet 2, the interface 5 receives the packet 2; and the interface 6 sends the packet 2.

In a possible implementation, if the outgoing interface aggregation group includes multiple outgoing interfaces that belong to the same NUMA node as the incoming interface, the method further includes: performing a hash operation based on a packet feature to obtain a hash operation result; determining, based on the hash operation result, the first outgoing interface from the outgoing interfaces of the outgoing interface aggregation group that belong to the same NUMA node as the incoming interface. For example, in the aforementioned specific embodiment, the packet is received from the interface 5, and it is determined that the outgoing interfaces which belong to the same NUMA node as the interface 5 are the interface 6 and the interface 7, then a hash operation may be performed based on the feature of the received packet, and the first outgoing interface for packet forwarding is determined from the interface 6 and the interface 7 based on the harsh operation result.

The method for packet forwarding based on the present disclosure enables selection of an outgoing interface for packet forwarding which belongs to the same NUMA node as an incoming interface having received the packet from an outgoing interface aggregation group corresponding to the incoming interface, without forwarding the packet across NUMA nodes. Therefore, only a local memory of a NUMA node needs to be accessed during the packet forwarding process, reducing the computational overhead of the device and improving the forwarding efficiency and throughput of the device.

In the load balancing by a hash operation, the packet features may include one or more of the following: a source IP address, a destination IP address, a source MAC address, a destination MAC address, a source port number, and a destination port number of a packet.

As an example of this implementation, the packet feature is a destination MAC address of a packet. The device performs a hash operation on the destination MAC address of the packet to obtain a hash operation result of the destination MAC address, and looks up a preset hash table based on the hash operation result of the destination MAC address to determine a first outgoing interface among multiple outgoing interfaces of the outgoing interface aggregation group which belong to the same NUMA node as the incoming interface.

As another example of this implementation, the packet feature is a destination port number of a packet. The device performs a hash operation on the destination port number of the packet to obtain the hash operation result of the destination port number, and looks up a preset hash table based on the hash operation result of the destination port number to determine a first outgoing interface among multiple outgoing interfaces of the outgoing interface aggregation group which belong to the same NUMA node as the incoming interface.

A hash table (Hash Table, also known as a hash map) is a data structure where a memory storage location is directly accessed based on a key value (Key). In other words, by means of calculating a function with regard to the key value, a record is accessed by mapping a data to be looked up (Value) to a location in the table, so as to increase the look-up speed. This mapping function is referred as a hash function, and an array storing the record is a hash table. The creation of a hash table is to generate a key value by a data to be looked up using a hash function and a conflict processing function, wherein the key value is the look-up mapping of the data to be looked up, and the data to be looked up is accessed by the key value.

It should be noted that those skilled in the art may understand that with different hash functions used in the hash operation, or with different parameters of the hash operation, the harsh operation result may be different, which is not limited in the present disclosure. In addition, although the foregoing describes packet features by taking the source IP address, the destination IP address, the source MAC address, the destination MAC address, the source port number, and the destination port number of the packet as examples, those skilled in the art may understand that the present disclosure is not limited thereto. Those skilled in the art may flexibly set the packet features based on the actual application scenario.

Figure 4:
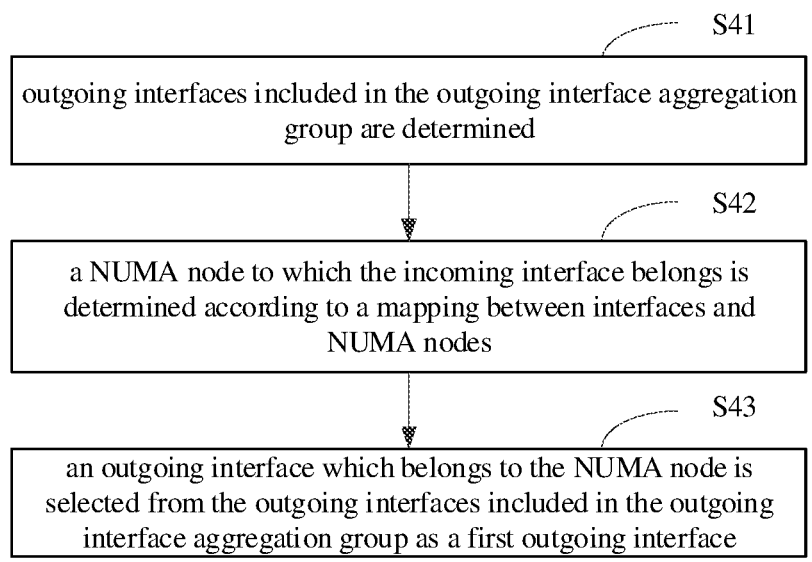
FIG. 4 is an exemplary flow chart of step S22 in the method for packet forwarding according to an embodiment of the present disclosure.

FIG. 4 is an exemplary flow chart of step S22 in the method for packet forwarding based on an embodiment of the present disclosure. As shown in FIG. 4, selecting a first outgoing interface for sending the packet from the at least one outgoing interface which belongs to the same NUMA node as the incoming interface in the outgoing interface aggregation group (the step S22) may include the following steps.

In step S41, outgoing interfaces included in the outgoing interface aggregation group are determined.

In step S42, a NUMA node to which the incoming interface belongs is determined based on a mapping between interfaces and NUMA nodes.

In a possible implementation, a NUMA node to which the incoming interface belongs may be determined by looking up an interface-NUMA node relationship table. For example, an incoming interface number is used as an indexing keyword, and the NUMA node to which the incoming interface belongs is determined by indexing the interface-NUMA node relationship table with the incoming interface number.

As an example of this implementation, table 1 shows an interface-NUMA node relationship table of the device A based on an embodiment of the present disclosure. In the case where the interface 1 receives a packet 1, the device A may look up the table 1 to determine that the NUMA node to which the interface 1 belongs is the NUMA node 1. In the case where the interface 5 receives a packet 2, the device A may look up the table 1 to determine that the NUMA node to which the interface 5 belongs is the NUMA node 2, and so on, which will not be repeatedly described in the present disclosure.

In step S43, an outgoing interface which belongs to the NUMA node is selected from the outgoing interfaces included in the outgoing interface aggregation group as a first outgoing interface.

As an example of the embodiment, as shown in FIG. 3, in the case where the interface 1 receives a packet 1, the device A looks up the forwarding table to determine that an outgoing interface aggregation group corresponding to the interface 1 is the outgoing interface aggregation group 2. The device A determines that multiple outgoing interfaces included in the outgoing interface aggregation group 2 are the interface 4, the interface 6, and the interface 7. The device A determines, based on the mapping between the interfaces and the NUMA nodes, that the NUMA node to which the interface 1 belongs is the NUMA node 1. The device A may determine whether the interface 4, the interface 6 and the interface 7 belong to the NUMA node 1 one by one, so as to select the interface 4 which belongs to the NUMA node 1 as the first outgoing interface from the outgoing interfaces included in the outgoing interface aggregation group 2.

TABLE 1

| Interface number | NUMA node number |
|---|---|
| interface 1 | NUMA node 1 |
| interface 2 | NUMA node 1 |
| interface 3 | NUMA node 1 |
| interface 4 | NUMA node 1 |
| interface 5 | NUMA node 2 |
| interface 6 | NUMA node 2 |
| interface 7 | NUMA node 2 |
| interface 8 | NUMA node 3 |

Figure 5:
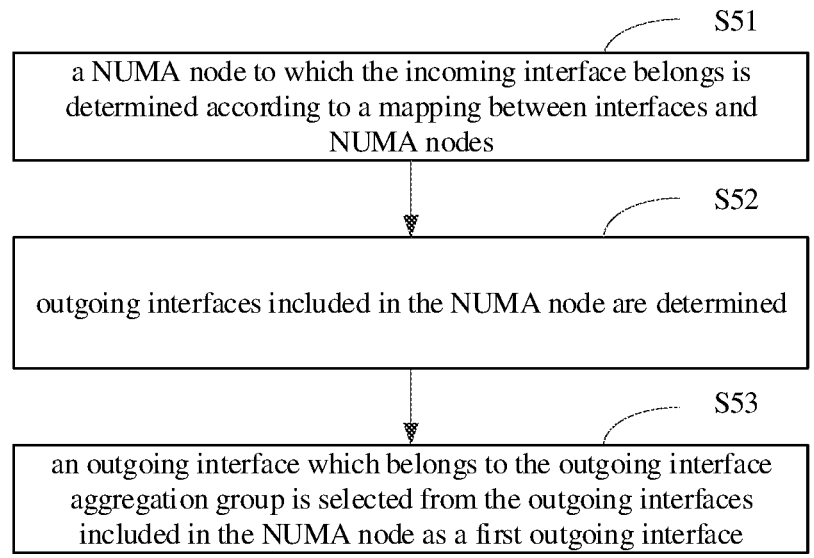
FIG. 5 is an exemplary flow chart of step S22 in the method for packet forwarding according to an embodiment of the present disclosure.

FIG. 5 is an exemplary flow chart of step S22 in the method for packet forwarding based on an embodiment of the present disclosure. As shown in FIG. 5, selecting a first outgoing interface for sending the packet from the at least one outgoing interface which belongs to the same NUMA node as the incoming interface in the outgoing interface aggregation group (the step S22) may include the following steps.

In step S51, a NUMA node to which the incoming interface belongs is determined based on a mapping between interfaces and NUMA nodes.

The description of step S51 may refer to that of the step S42, which will not be repeatedly described in the present disclosure.

In step S52, outgoing interfaces included in the NUMA node are determined.

In a possible implementation, the outgoing interfaces included in the NUMA node may be determined by looking up a NUMA node-interface relationship table. For example, first, a NUMA node number is used as an index keyword, and interfaces included in a NUMA node is determined by indexing the NUMA node-interface relationship table with the NUMA node number; then, the outgoing interface is used as an index keyword to determine the outgoing interfaces included in the NUMA node.

As an example of this implementation, table 2 shows a NUMA node-interface relationship table in the device A based on an embodiment of the present disclosure. In the case where the interface 1 receives a packet 1, the device A may look up the table 1 to determine that the NUMA node to which the interface 1 belongs is the NUMA node 1, and the device A may look up the table 2 to determine that outgoing interfaces included in the NUMA node 1 are the interface 2, the interface 3, and the interface 4. In the case where the interface 5 receives a packet 2, the device A may look up the table 1 to determine that the NUMA node to which the interface 5 belongs is the NUMA node 2, and the device A may look up the table 2 to determine that outgoing interfaces included in the NUMA node 2 are the interface 6 and the interface 7, and so on, which will not be repeatedly described in the present disclosure.

In step S53, an outgoing interface which belongs to the outgoing interface aggregation group is selected from the outgoing interfaces included in the NUMA node as a first outgoing interface.

As an example of the embodiment, as shown in FIG. 3, in the case where the interface 1 receives a packet 1, the device A determines, based on a mapping between interfaces and NUMA nodes, that the NUMA node to which the interface 1 belongs is the NUMA node 1. The device A determines that outgoing interfaces included in the NUMA node 1 are the interface 2, the interface 3, and the interface 4. The device A looks up the forwarding table to determine that an outgoing interface aggregation group corresponding to the interface 1 is the outgoing interface aggregation group 2. The device A may determine whether the interface 2, the interface 3, and the interface 4 belong to the outgoing interface aggregation group 2 one by one, so as to select the interface 4 which belongs to the outgoing interface aggregation group 2 from the outgoing interfaces included in the NUMA node 1 as a first outgoing interface.

TABLE 2

| NUMA node number | incoming interface number | outgoing interface number |
|---|---|---|
| NUMA node 1 | interface 1 | interface 2, interface 3, interface 4 |
| NUMA node 2 | interface 5 | interface 6, interface 7 |
| NUMA node 3 | interface 8 | null |

Figure 6:
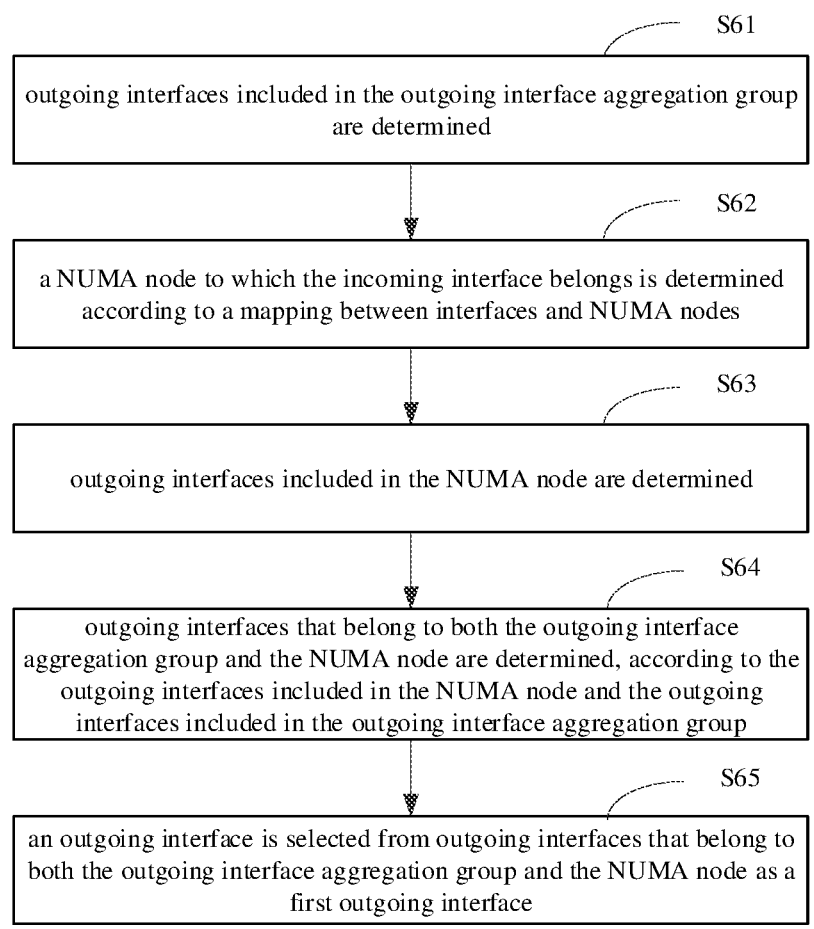
FIG. 6 is an exemplary flow chart of step S22 in the method for packet forwarding according to an embodiment of the present disclosure.

FIG. 6 is an exemplary flow chart of step S22 in the method for packet forwarding based on an embodiment of the present disclosure. As shown in FIG. 6, selecting a first outgoing interface for sending the packet from the at least one outgoing interface which belongs to the same NUMA node as the incoming interface in the outgoing interface aggregation group (the step S22) may include the following steps.

In step S61, outgoing interfaces included in the outgoing interface aggregation group are determined.

In step S62, a NUMA node to which the incoming interface belongs is determined based on a mapping between interfaces and NUMA nodes.

The description of step S62 may refer to that of the step S42, which will not be repeatedly described in the present disclosure.

In step S63, outgoing interfaces included in the NUMA node are determined.

The description of step S63 may refer to that of the step S52, which will not be repeatedly described in the present disclosure.

In step S64, outgoing interfaces that belong to both the outgoing interface aggregation group and the NUMA node are determined, based on the outgoing interfaces included in the NUMA node and the outgoing interfaces included in the outgoing interface aggregation group.

In step S65, an outgoing interface is selected from the outgoing interfaces that belong to both the outgoing interface aggregation group and the NUMA node as a first outgoing interface.

As an example of this embodiment, as shown in FIG. 3, in the case where the interface 1 receives a packet 1, the device A looks up a forwarding table to determine that an outgoing interface aggregation group corresponding to the interface 1 is the outgoing interface aggregation group 2. The device A determines that multiple outgoing interfaces included in the outgoing interface aggregation group 2 are the interface 4, the interface 6, and the interface 7. The device A determines, based on a mapping between interfaces and NUMA nodes, that a NUMA node to which the interface 1 belongs is the NUMA node 1. The device A determines that outgoing interfaces included in NUMA node 1 are the interface 2, the interface 3, and the interface 4. The device A determines that outgoing interface that belongs to both the outgoing interface aggregation group 2 and the NUMA node 1 is the interface 4. The device A takes the interface 4 that belongs to both the outgoing interface aggregation group 2 and the NUMA node 1 as a first outgoing interface.

As an example of this embodiment, as shown in FIG. 3, in the case where the interface 5 receives a packet 2, the device A looks up a forwarding table to determine that an outgoing interface aggregation group corresponding to the interface 5 is the outgoing interface aggregation group 2. The device A determines that multiple outgoing interfaces included in the outgoing interface aggregation group 2 are the interface 4, the interface 6, and the interface 7. The device A determines, based on a mapping between interfaces and NUMA nodes, that a NUMA node to which the interface 5 belongs is the NUMA node 2. The device A determines that outgoing interfaces included in NUMA node 2 are the interface 6 and the interface 7. The device A determines that the outgoing interfaces that belong to both the outgoing interface aggregation group 2 and the NUMA node 2 are the interface 6 and the interface 7. The device A selects an outgoing interface from the interface 6 and the interface 7 which belong to both the outgoing interface aggregation group 2 and the NUMA node 1 as a first outgoing interface. For example, a packet feature of the packet 2 is a source MAC address, and the device A performs a hash operation on the source MAC address of the packet 2 to obtain a hash operation result of the source MAC address, looks up a preset hash table based on the hash operation result of the source MAC address, and determines the interface 6 from the interface 6 and the interface 7 as an outgoing interface for sending the packet 2.

Figure 7:
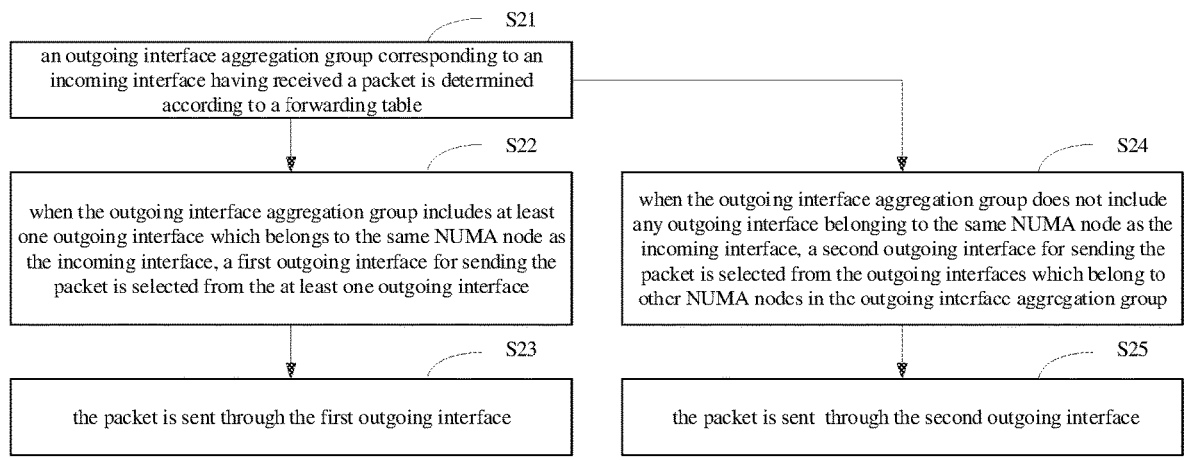
FIG. 7 is an exemplary flow chart of a method for packet forwarding according to an embodiment of the present disclosure.

FIG. 7 is an exemplary flow chart of a method for packet forwarding based on an embodiment of the present disclosure. As shown in FIG. 7, the method includes step S21 to step S25.

In the step S21, an outgoing interface aggregation group corresponding to an incoming interface having received a packet is determined based on a forwarding table.

In the step S22, when the outgoing interface aggregation group includes at least one outgoing interface that belongs to the same NUMA node as the incoming interface, a first outgoing interface for sending the packet is selected from the at least one outgoing interface.

In the step S23, the packet is sent through the first outgoing interface.

In the step S24, when the outgoing interface aggregation group does not include any outgoing interface belonging to the same NUMA node as the incoming interface, a second outgoing interface for sending the packet is selected from the outgoing interfaces in the outgoing interface aggregation group which belong to other NUMA nodes.

In the step S25, the packet is sent through the second outgoing interface.

As an example of this embodiment, as shown in FIG. 3, in the case where the interface 8 receives a packet 3, the device A looks up a forwarding table to determine that an outgoing interface aggregation group corresponding to the interface 8 is the outgoing interface aggregation group 2. The device A determines that multiple outgoing interfaces included in the outgoing interface aggregation group 2 are the interface 4, the interface 6, and the interface 7. The device A determines, based on a mapping between interfaces and NUMA nodes, that a NUMA node to which the interface 8 belongs is the NUMA node 3. None of the outgoing interfaces determined based on the forwarding table belongs to the NUMA node to which the incoming interface belongs, that is, the interface 4, the interface 6, and the interface 7 do not belong to the NUMA node 3. Therefore, the outgoing group aggregation group 2 does not include any outgoing interface that belongs to the same NUMA node as the interface 8, and the outgoing interface for sending the packet 3 is determined from the interface 4, the interface 6, and the interface 7 included in the outgoing interface aggregation group 2. For example, a packet feature of the packet 3 is a source MAC address, and the device A performs a hash operation on the source MAC address of the packet 3 to obtain a hash operation result of the source MAC address, looks up a preset hash table based on the hash operation result of the source MAC address, and determines the interface 7 from the interface 4, the interface 6, and the interface 7 as an outgoing interface for sending packet 3.

Figure 8:
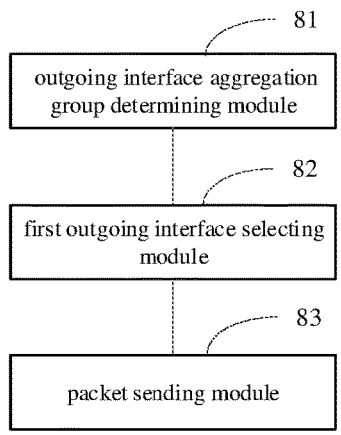
FIG. 8 is a block diagram of an apparatus for packet forwarding according to an embodiment of the present disclosure.

FIG. 8 is a block diagram of an apparatus for packet forwarding based on an embodiment of the present disclosure. The apparatus may be used for devices of NUMA architecture, such as a NUMA server, and so on, which is not limited in the present disclosure. As shown in FIG. 8, the apparatus comprises:

An outgoing interface aggregation group determining module 81 configured to determine, based on a forwarding table, an outgoing interface aggregation group corresponding to an incoming interface having received a packet; a first outgoing interface selecting module 82 for selecting, when the outgoing interface aggregation group includes an outgoing interface which belongs to the same non-uniform memory access architecture NUMA node as the incoming interface, a first outgoing interface for sending the packet from the outgoing interfaces in the outgoing interface aggregation group and belonging to the same non-uniform memory access architecture NUMA node as the incoming interface; a packet sending module 83 for sending the packet through the first outgoing interface.

In a possible implementation, the first outgoing interface selecting module 82 includes: a first determining module configured to determine outgoing interfaces included in an outgoing interface aggregation group; a NUMA node determining module for determining, based on a mapping between interfaces and NUMA nodes, a NUMA node to which the incoming interface belongs; a first selecting module configured to select an outgoing interface which belongs to the NUMA node from the outgoing interfaces included in the outgoing interface aggregation group as the first outgoing interface.

In a possible implementation, the first outgoing interface selecting module 82 includes: a NUMA node determining module configured to determine, based on a mapping between interfaces and NUMA nodes, a NUMA node to which the incoming interface belongs; a second determining module for determining outgoing interfaces included in the NUMA node; a second selecting module configured to select an outgoing interface which belongs to the outgoing interface aggregation group from outgoing interfaces included in the NUMA node as the first outgoing interface.

In a possible implementation, the first outgoing interface selecting module 82 includes: a first determining module configured to determine outgoing interfaces included in the outgoing interface aggregation group; a NUMA node determining module for determining, based on a mapping between interfaces and NUMA nodes, a NUMA node to which the incoming interface belongs; a second determining module for determining outgoing interfaces included in the NUMA node; a third determining module for determining, based on the outgoing interfaces included in the NUMA node and the outgoing interfaces included in the outgoing interface aggregation group, outgoing interfaces which belong to both the outgoing interface aggregation group and the NUMA node; a third selecting module for selecting an outgoing interface from the outgoing interfaces which belong to both the outgoing interface aggregation group and the NUMA node as the first outgoing interface.

Figure 9:
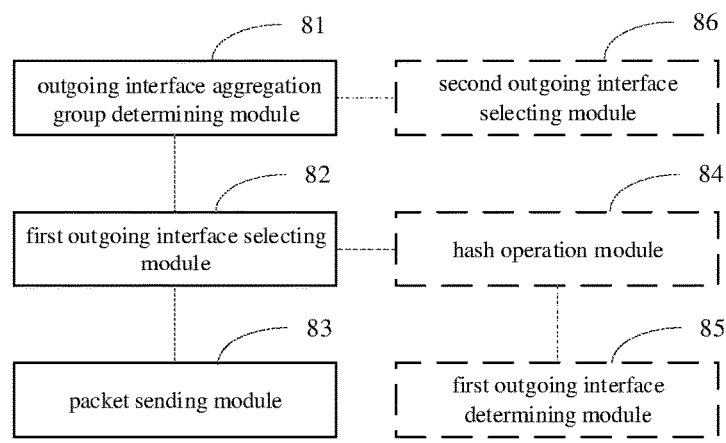
FIG. 9 is an exemplary block diagram of an apparatus for packet forwarding according to an embodiment of the present disclosure.

FIG. 9 is an exemplary block diagram of an apparatus for packet forwarding based on an embodiment of the present disclosure. As shown in FIG. 9:

In a possible implementation, if there are multiple outgoing interfaces in the outgoing interface aggregation group that belong to the same NUMA node as the incoming interface, the apparatus further comprises: a hash operation module 84 configured to perform a hash operation based on a packet feature to obtain a hash operation result; a first outgoing interface determining module 85 for determining, based on the hash operation result, the first outgoing interface from the outgoing interfaces of the outgoing interface aggregation group which belong to the same NUMA node as the incoming interface.

In a possible implementation, the apparatus further includes: a second outgoing interface selecting module 86 for determining, when the outgoing interface aggregation group does not include an outgoing interface which belongs to the same NUMA node as the incoming interface, a second outgoing interface for sending the packet from outgoing interfaces of the outgoing interface aggregation group which belong to other NUMA nodes.

The apparatus for packet forwarding of the present disclosure may select, from the outgoing interface aggregation group corresponding to the incoming interface having received the packet, an outgoing interface which belongs to the same NUMA node as the incoming interface to forward the packet without forwarding the packet across NUMA nodes. Therefore, only a local memory of the NUMA node needs to be accessed during the packet forwarding process, reducing the computational overhead of the device and improving the forwarding efficiency and throughput of the device.

Figure 10:
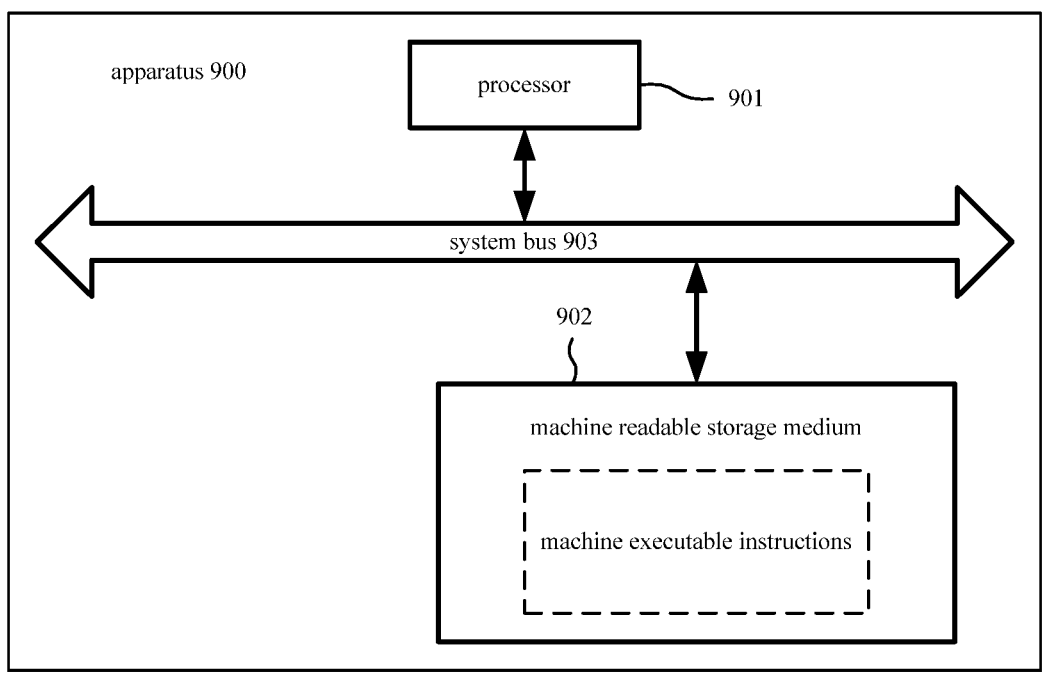
FIG. 10 is a block diagram illustrating an apparatus 900 for packet forwarding according to an exemplary embodiment.

FIG. 10 is a block diagram illustrating an apparatus 900 for packet forwarding based on an exemplary embodiment. Referring to FIG. 10, the apparatus 900 may include a processor 901 and a machine readable storage medium 902 storing machine executable instructions. The processor 901 and the machine readable storage medium 902 may communicate via a system bus 903. Moreover, the processor 901 executes the aforementioned method for packet forwarding by reading the machine executable instructions corresponding to a packet forwarding logic in the machine readable storage medium 902. A specific method for packet forwarding may refer to the method shown in FIG. 2, FIG. 3 to FIG. 7, and the foregoing specific embodiments, which will not be repeated in this embodiment.

The machine readable storage medium 902 mentioned in this description may be any electronic, magnetic, optical, or other physical storage apparatus that may contain or store information, such as executable instructions, data, and the like. For example, the machine readable storage medium may be a Random Access Memory (RAM, a volatile memory, a non-volatile memory, a flash memory, a storage drive (such as a hard drive), a solid state disk, any type of storage disk (such as a compact disc, a DVD, etc.), or a similar storage medium, or a combination thereof.

It should be noted that those skilled in the art may understand that the apparatus 900 shown in FIG. 10 is a schematic diagram of a NUMA node in a NUMA framework. The NUMA framework may be a structure including a plurality of apparatuses 900, which will not be repeatedly described in the present disclosure.

Although the embodiments of the present disclosure have been described above, it will be appreciated that the above descriptions are merely exemplary but not exhaustive, and the present disclosure is not limited to the disclosed embodiments. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

The invention claimed is:

1. A method for packet forwarding, comprising:
    determining, based on a forwarding table, an outgoing interface aggregation group corresponding to an incoming interface having received a packet among multiple outgoing interface aggregation groups, wherein the forwarding table indicating a relationship between incoming interfaces and outgoing interface aggregation groups;
    selecting, when determining that the outgoing interface aggregation group includes at least one outgoing interface which belongs to the same NUMA node as the incoming interface and an outgoing interface which belongs to other NUMA nodes, a first outgoing interface for sending the packet from the at least one outgoing interface, wherein the NUMA node being a non-uniform memory access architecture node; and
    sending the packet through the first outgoing interface;
    wherein selecting a first outgoing interface for sending the packet from the at least one outgoing interface includes:
        determining, based on a mapping between interfaces and NUMA nodes, a NUMA node to which the incoming interface belongs; and
        selecting one outgoing interface which belongs to the NUMA node from the outgoing interfaces included in the outgoing interface aggregation group as the first outgoing interface.

2. The method according to claim 1, selecting a first outgoing interface for sending the packet from the at least one outgoing interface includes:
    determining outgoing interfaces included in the outgoing interface aggregation group; and selecting an outgoing interface which belongs to the NUMA node from the outgoing interfaces included in the outgoing interface aggregation group as the first outgoing interface.

3. The method according to claim 1, selecting a first outgoing interface for sending the packet from the at least one outgoing interface includes:
   determining outgoing interfaces included in the NUMA node; and
   selecting an outgoing interface which belongs to the outgoing interface aggregation group from the outgoing interfaces included in the NUMA node as the first outgoing interface.

4. The method according to claim 1, when the outgoing interface aggregation group includes multiple outgoing interfaces which belong to the same NUMA node as the incoming interface, the method further comprises:
   performing, based on a packet feature, a hash operation to obtain a hash operation result; and
   determining, based on the hash operation result, the first outgoing interface from the outgoing interfaces in the outgoing interface aggregation group which belong to the same NUMA node as the incoming interface.

5. The method according to claim 1, further comprising:
   determining, when the outgoing interface aggregation group does not include any outgoing interface belonging to the same NUMA node as the incoming interface, a second outgoing interface for sending the packet from outgoing interfaces in the outgoing interface aggregation group which belong to other NUMA nodes.

6. An apparatus for packet forwarding, comprising:
   a processor;
   a machine readable storage medium storing machine executable instructions,
   wherein when the machine executable instructions are being read and executed, the processor is caused to:
   determine, based on a forwarding table, an outgoing interface aggregation group corresponding to an incoming interface having received a packet among multiple outgoing interface aggregation groups, wherein the forwarding table indicating a relationship between incoming interfaces and outgoing interface aggregation groups;
   select, when determining that the outgoing interface aggregation group includes at least one outgoing interface which belongs to the same NUMA node as the incoming interface and an outgoing interface which belongs to other NUMA nodes, from the at least one outgoing interface a first outgoing interface for sending the packet, wherein the NUMA node being a non-uniform memory access architecture node; and
   send the packet through the first outgoing interface;
   wherein the processor is further configured to:
   determine, based on a mapping between interfaces and NUMA nodes, a NUMA node to which the incoming interface belongs; and
   select one outgoing interface which belongs to the NUMA node from the outgoing interfaces included in the outgoing interface aggregation group as the first outgoing interface.

7. The apparatus according to claim 6, in order to select a first outgoing interface for sending the packet from the at least one outgoing interface, the processor is caused to:
   determine outgoing interfaces included in the outgoing interface aggregation group;-and
   select an outgoing interface which belongs to the NUMA node from the outgoing interfaces included in the outgoing interface aggregation group as the first outgoing interface.

8. The apparatus according to claim 6, in order to select a first outgoing interface for sending the packet from the at least one outgoing interface, the processor is caused to:
   determine outgoing interfaces included in the NUMA node; and
   select an outgoing interface which belongs to the outgoing interface aggregation group from the outgoing interfaces included in the NUMA node as the first outgoing interface.

9. The apparatus according to claim 6, when the outgoing interface aggregation group includes multiple outgoing interfaces which belong to the same NUMA node as the incoming interface, the processor is further caused to:
   perform, based on a packet feature, a hash operation to obtain a hash operation result; and
   determine, based on the hash operation result, the first outgoing interface from the outgoing interfaces in the outgoing interface aggregation group which belong to the same NUMA node as the incoming interface.

10. The apparatus according to claim 6, the processor is further caused to:
    determine, when the outgoing interface aggregation group does not include any outgoing interface belonging to the same NUMA node as the incoming interface, a second outgoing interface for sending the packet from outgoing interfaces in the outgoing interface aggregation group which belong to other NUMA nodes.

11. An apparatus for packet forwarding, comprising:
    an outgoing interface aggregation group determining module configured to determine, based on a forwarding table, an outgoing interface aggregation group corresponding to an incoming interface having received a packet among multiple outgoing interface aggregation groups, wherein the forwarding table indicating a relationship between incoming interfaces and outgoing interface aggregation groups;
    a first outgoing interface selecting module configured to select, when determining that the outgoing interface aggregation group includes at least one outgoing interface which belongs to the same NUMA node as the incoming interface and an outgoing interface which belongs to other NUMA nodes, from the at least one outgoing interface a first outgoing interface for sending the packet, wherein the NUMA node being a non-uniform memory access architecture node; and
    a packet sending module configured to send the packet through the first outgoing interfaces;
    wherein the first outgoing interface selecting module comprises a NUMA node determining module configured to determine, based on a mapping between interfaces and NUMA nodes, a NUMA node to which the incoming interface belongs;
    the first outgoing interface selecting module is configured to select one outgoing interface which belongs to the NUMA node from the outgoing interfaces included in the outgoing interface aggregation group as the first outgoing interface.

12. The apparatus according to claim 11, the first outgoing interface selecting module comprises:
    a first determining module configured to determine outgoing interfaces included in the outgoing interface aggregation group.

13. The apparatus according to claim 11, the first outgoing interface selecting module comprises:
- a second determining module configured to determine outgoing interfaces included in the NUMA node; and
- a second selecting module configured to select an outgoing interface which belongs to the outgoing interface aggregation group from the outgoing interfaces included in the NUMA node as the first outgoing interface.

14. The apparatus according to claim 11, the first outgoing interface selecting module comprises:
- a first determining module configured to determine outgoing interfaces included in the outgoing interface aggregation group;
- a NUMA node determining module configured to determine, based on a mapping between interfaces and NUMA nodes, a NUMA node to which the incoming interface belongs;
- a second determining module configured to determine outgoing interfaces included in the NUMA node;
- a third determining module configured to determine, based on outgoing interfaces included in the NUMA node and outgoing interfaces included in the outgoing interface aggregation group, outgoing interfaces which belong to both the outgoing interface aggregation group and the NUMA node; and
- a third selecting module configured to select an outgoing interface as the first outgoing interface from the outgoing interfaces which belong to both the outgoing interface aggregation group and the NUMA node.

15. The apparatus according to claim 11, further comprising:
- a hash operation module configured to perform, when the outgoing interface aggregation group includes multiple outgoing interfaces which belong to the same NUMA node as the incoming interface, a hash operation based on a packet feature to obtain a hash operation result; and
- a first outgoing interface determining module configured to determine, based on the hash operation result, the first outgoing interface from the outgoing interfaces in the outgoing interface aggregation group which belong to the same NUMA node as the incoming interface.

16. The apparatus according to claim 11, further comprising:
- a second outgoing interface selecting module configured to determine, when the outgoing interface aggregation group does not include any outgoing interface belonging to the same NUMA node as the incoming interface, a second outgoing interface for sending the packet from outgoing interfaces in the outgoing interface aggregation group which belong to other NUMA nodes.

* * * * *

UNITED STATES PATENT AND TRADEMARK OFFICE
CERTIFICATE OF CORRECTION

PATENT NO. : 11,343,175 B2
APPLICATION NO. : 16/643175
DATED : May 24, 2022
INVENTOR(S) : Liu et al.

It is certified that error appears in the above-identified patent and that said Letters Patent is hereby corrected as shown below:

In the Claims

Claim 11, Column 14, Line 52: please replace "interfaces" with --interface--

Signed and Sealed this
Eleventh Day of October, 2022

Katherine Kelly Vidal
*Director of the United States Patent and Trademark Office*